United States Patent
Lopez et al.

(10) Patent No.: US 11,431,532 B2
(45) Date of Patent: Aug. 30, 2022

(54) TRANSMITTING SIGNALS (71) Applicant: Telefonaktiebolaget LM Ericsson (publ), Stockholm (SE)

(72) Inventors: Miguel Lopez, Solna (SE); Leif Wilhelmsson, Lund (SE); Dennis Sundman, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/273,606

(22) PCT Filed: Sep. 7, 2018

(86) PCT No.: PCT/EP2018/074158
§ 371 (c)(1),
(2) Date: Mar. 4, 2021

(87) PCT Pub. No.: WO2020/048613
PCT Pub. Date: Mar. 12, 2020

(65) Prior Publication Data
US 2021/0258196 A1 Aug. 19, 2021

(51) Int. Cl.
*H04L 27/04* (2006.01)
*H04L 27/26* (2006.01)

(52) U.S. Cl.
CPC .......... *H04L 27/04* (2013.01); *H04L 27/2627* (2013.01)

(58) Field of Classification Search
CPC .. H04L 27/04; H04L 27/2627; H04L 27/2613
See application file for complete search history.

(56) References Cited

U.S. PATENT DOCUMENTS

| | | | | |
|---|---|---|---|---|
| 8,385,461 B1 * | 2/2013 | Pettus | ..................... | H04L 27/04 375/259 |
| 9,485,733 B1 * | 11/2016 | Park | ..................... | H04L 27/2613 |
| 10,725,524 B2 * | 7/2020 | Nasrullah | ............. | G06F 1/3234 |
| 11,133,965 B2 * | 9/2021 | Park | ......................... | H04L 27/04 |
| 11,160,020 B2 * | 10/2021 | Shellhammer | ........ | H04L 27/361 |

(Continued)

FOREIGN PATENT DOCUMENTS

| | | |
|---|---|---|
| JP | 2007529972 A | 10/2007 |
| WO | 2005099211 A1 | 10/2005 |

OTHER PUBLICATIONS

Cao, R. et al., "Discussion on WUR Multi-Antenna Transmission", Mar. 5, 2018, pp. 1-17, IEEE 802.11-18/0413r2, IEEE.

(Continued)

*Primary Examiner* — Khanh C Tran
(74) *Attorney, Agent, or Firm* — Coats & Bennett, PLLC (57) ABSTRACT

In one example aspect, a method of transmitting signals is provided. The method comprises transmitting a first multi-carrier on-off keyed signal comprising a plurality of on periods and a plurality of off periods. Transmitting the first signal in each on period comprises, for each subcarrier of a plurality of subcarriers, transmitting, from each antenna of a plurality of antennas, a frequency domain symbol associated with that subcarrier phase shifted by a respective factor of a set of factors associated with that subcarrier, wherein the set of factors associated with that subcarrier is different from the set of factors associated with at least one other subcarrier of the plurality of subcarriers.

26 Claims, 6 Drawing Sheets

(56) References Cited

U.S. PATENT DOCUMENTS

2018/0019902 A1  1/2018  Suh et al.
2018/0152333 A1  5/2018  Shellhammer et al.

OTHER PUBLICATIONS

Shellhammer, S. et al., "Multiantenna TX Diversity", May 7, 2018, pp. 1-23, IEEE 802.11-18/0773r0, IEEE.
Shellhammer, S. et al., "Proposed Draft WUR PHY Specification", Jan. 1, 2018, IEEE IEEE 802.11-18/0152r5, IEEE.

* cited by examiner

| 1 | 1 | 1 | 1 |
|---|---|---|---|
| 1 | -j | -1 | j |
| 1 | -1 | 1 | -1 |
| 1 | j | -1 | -j |

| Subcarrier # | -6 | -5 | -4 | -3 | -2 | -1 | 0 | 1 | 2 | 3 | 4 | 5 | 6 |
|---|---|---|---|---|---|---|---|---|---|---|---|---|---|
| Column of DTF matrix | (1) | (2) | (3) | (4) | (1) | (2) | | (3) | (4) | (1) | (2) | (3) | (4) |
| Freq domain symbol TX antenna #1 | 1 | 1 | 1 | 1 | 1 | 1 | 0 | 1 | 1 | 1 | 1 | 1 | 1 |
| Freq domain symbol TX antenna #2 | 1 | -j | -1 | -j | 1 | -j | 0 | -1 | -j | 1 | -j | -1 | -j |
| Freq domain symbol TX antenna #3 | 1 | -1 | 1 | -1 | 1 | -1 | 0 | -1 | -1 | 1 | -1 | 1 | -1 |
| Freq domain symbol TX antenna #4 | 1 | j | -1 | j | 1 | j | 0 | -1 | j | 1 | j | -1 | j |

FIG. 6 (600)

| Subcarrier # | -6 | -5 | -4 | -3 | -2 | -1 | 0 | 1 | 2 | 3 | 4 | 5 | 6 |
|---|---|---|---|---|---|---|---|---|---|---|---|---|---|
| Column of DTF matrix | (1) | (1) | (1) | (2) | (2) | (2) | | (3) | (3) | (3) | (4) | (4) | (4) |
| Freq domain symbol TX antenna #1 | 1 | 1 | 1 | 1 | 1 | 1 | 0 | 1 | 1 | 1 | 1 | 1 | 1 |
| Freq domain symbol TX antenna #2 | 1 | 1 | 1 | -j | -j | -j | 0 | -1 | -1 | -1 | j | j | j |
| Freq domain symbol TX antenna #3 | 1 | 1 | 1 | -1 | -1 | -1 | 0 | 1 | 1 | 1 | -1 | -1 | -1 |
| Freq domain symbol TX antenna #4 | 1 | 1 | 1 | j | j | j | 0 | -1 | -1 | -1 | -j | -j | -j |

|   |    |
|---|----|
| 1 | 1  |
| 1 | -1 |

| Subcarrier # | -6 | -5 | -4 | -3 | -2 | -1 | 0 | 1 | 2 | 3 | 4 | 5 | 6 |
|---|---|---|---|---|---|---|---|---|---|---|---|---|---|
| Column of DTF matrix | (1) | (2) | (1) | (2) | (1) | (2) | | (1) | (2) | (1) | (2) | (1) | (2) |
| Freq domain symbol TX antenna #1 | 1 | 1 | 1 | 1 | 1 | 1 | 0 | 1 | 1 | 1 | 1 | 1 | 1 |
| Freq domain symbol TX antenna #2 | 1 | -1 | 1 | -1 | 1 | -1 | 0 | 1 | -1 | 1 | -1 | 1 | -1 |

| Complex phase | a | b | c | d | e | f | 0 | g | h | i | j | k | l |
|---|---|---|---|---|---|---|---|---|---|---|---|---|---|
| Subcarrier # | -6 | -5 | -4 | -3 | -2 | -1 | 0 | 1 | 2 | 3 | 4 | 5 | 6 |
| Column of DTF matrix | (1) | (2) | (1) | (2) | (1) | (2) | | (1) | (2) | (1) | (2) | (1) | (2) |
| Freq domain symbol TX antenna #1 | a | b | c | d | e | f | 0 | g | h | i | j | k | l |
| Freq domain symbol TX antenna #2 | a | -b | c | -d | e | -f | 0 | g | -h | i | -j | k | -l |

TRANSMITTING SIGNALS

TECHNICAL FIELD

Examples of the present disclosure relate to transmitting signals, for example from multiple antennas on multiple subcarriers.

BACKGROUND

Wake-up receivers (WUR), sometimes also referred to as wake-up radios, provide a means to significantly reduce the power consumption in receivers used in wireless communication. The idea with a WUR is that it can be based on a low-power architecture, as it only needs to be able to detect the presence of a wake-up signal. Once a wake-up signal is detected, it may wake up another receiver used for data reception.

A commonly used modulation for a wake-up packet (WUP), i.e. a signal sent to the WUR to wake it up, is on-off keying (OOK). OOK is a binary modulation, where a logical one is represented with sending a signal (ON) whereas a logical zero is represented by not sending a signal (OFF). A WUP may be referred to as a WUR PPDU (PLOP protocol data unit, where PLOP is Physical Layer Convergence Protocol).

Figure 1:
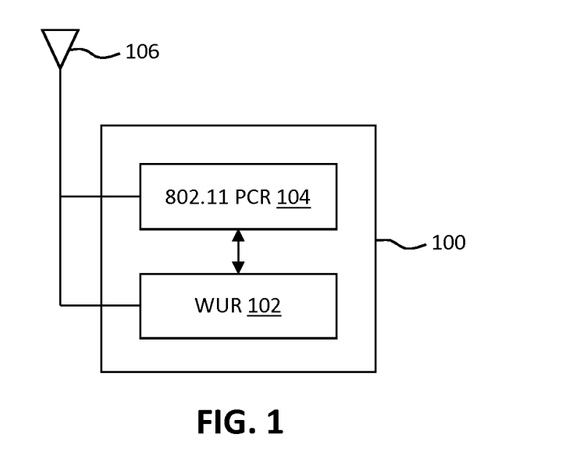
FIG. 1 shows an example of a device including a Wake-Up Receiver.

FIG. 1 shows an example of a device 100 including a Wake-Up Receiver (WUR) 102. The device 100 also includes an 802.11 Primary Connectivity Radio (PCR) 104. The WUR 102 and PCR 104 are connected to a common antenna 106. When the WUR 102 is turned on and waiting for the wake-up signal, the 802.11 PCR 104 can be switched off to preserve power. Once the wake up signal is received and detected by the WUR 102 it can wake up the 802.11 PCR 104, which may start communicating, for example with an access point (AP) using Wi-Fi.

SUMMARY

One aspect of the present disclosure provides a method of transmitting signals. The method comprises transmitting a first multi-carrier on-off keyed signal comprising a plurality of on periods and a plurality of off periods. Transmitting the first signal in each on period comprises, for each subcarrier of a plurality of subcarriers, transmitting, from each antenna of a plurality of antennas, a frequency domain symbol associated with that subcarrier phase shifted by a respective factor of a set of factors associated with that subcarrier, wherein the set of factors associated with that subcarrier is different from the set of factors associated with at least one other subcarrier of the plurality of subcarriers.

Another aspect of the present disclosure provides apparatus for transmitting signals. The apparatus comprises a processor and a memory. The memory contains instructions executable by the processor such that the apparatus is operable to transmit a first multi-carrier on-off keyed signal comprising a plurality of on periods and a plurality of off periods. Transmitting the first signal in each on period comprises, for each subcarrier of a plurality of subcarriers, transmitting, from each antenna of a plurality of antennas, a frequency domain symbol associated with that subcarrier phase shifted by a respective factor of a set of factors associated with that subcarrier, wherein the set of factors associated with that subcarrier is different from the set of factors associated with at least one other subcarrier of the plurality of subcarriers.

A further aspect of the present disclosure provides apparatus for transmitting signals. The apparatus is configured to transmit a first multi-carrier on-off keyed signal comprising a plurality of on periods and a plurality of off periods. Transmitting the first signal in each on period comprises, for each subcarrier of a plurality of subcarriers, transmitting, from each antenna of a plurality of antennas, a frequency domain symbol associated with that subcarrier phase shifted by a respective factor of a set of factors associated with that subcarrier, wherein the set of factors associated with that subcarrier is different from the set of factors associated with at least one other subcarrier of the plurality of subcarriers.

A still further aspect of the present disclosure provides for transmitting signals. The apparatus comprises a transmitter module configured to transmit a first multi-carrier on-off keyed signal comprising a plurality of on periods and a plurality of off periods. The transmitter module is configured to transmit the first signal in each on period by, for each subcarrier of a plurality of subcarriers, transmitting, from each antenna of a plurality of antennas, a frequency domain symbol associated with that subcarrier phase shifted by a respective factor of a set of factors associated with that subcarrier, wherein the set of factors associated with that subcarrier is different from the set of factors associated with at least one other subcarrier of the plurality of subcarriers.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Manchester coding may be applied to data symbols of a Wake-Up Packet (WUP). That is, a data symbol comprising a logical "0" is encoded as "10" and a data symbol comprising a logical "1" as "01". Therefore, for example, using On-Off Keying (OOK), every data symbol comprises an "ON" part (where there is energy transmitted) and an "OFF" part, where there is no energy transmitted. The order of the "ON" and "OFF" parts indicates whether the symbol is a logical "1" or "0". In addition, in some examples, the signals during an "ON" period of the WUP may be generated by means of an inverse fast Fourier transform (IFFT), as this functionality already be available in some transmitters, such as for example Wi-Fi transmitters supporting 802.11a, g, n and/or ac. An example IFFT has 64 points and operates at a sampling rate of 20 MHz, and just as for ordinary orthogonal frequency division multiplexing (OFDM), a cyclic prefix (CP) is added after the IFFT operation in order to keep the OFDM symbol duration used in 802.11a/g/n/ac. An example approach for generating the OOK signal is to use the 13 sub-carriers in the center, and then populating these with signals to represent ON periods and to not transmit anything at all during OFF periods. This may be referred to as multicarrier OOK (MC-OOK). The same OFDM symbol may be used to generate MC-OOK. In other words, the same frequency domain symbol is used to populate each of the non-zero subcarriers for all data symbols. Using the same OFDM symbol to generate the "ON" part of every Manchester coded data symbol may have some advantages. For example, it allows coherent reception of the MC-OOK.

Devices such as access points may possess several transmit antennas. Hence a transmit diversity scheme may be desirable to avoid unintentional destructive interference in any particular spatial direction. At least some embodiments of the present disclosure provide methods to generate signals such as multi-antenna MC-OOK signals, which may comprise wake-up packets (WUPs). In some examples, the OFDM symbol used to generate the ON part of each (e.g. Manchester coded) data symbol is antenna specific. That is, different OFDM symbols are transmitted through different antennas. In some examples, these antenna specific OFDM symbols may be generated by choosing the frequency domain symbols corresponding to any given subcarrier from different entries in a column (or row) of a Discrete Fourier Transform (DFT) matrix, or for example by rotating or phase shifting a frequency domain symbol by entries in a column (or row) of the DFT matrix for signals transmitted on a subcarrier from multiple antennas. In some examples, when the number of non-zero subcarriers exceeds the number of transmit antennas, a column (or row) of the DFT matrix can be used repeatedly. In some examples, columns (or rows) are used the same number of times. In some examples, therefore, where rows (or columns) of a DFT matrix are used, orthogonal beams may be generated, one beam per subcarrier, which in turn may result in an even spatial distribution of the transmitted energy of the signals.

Figure 2:
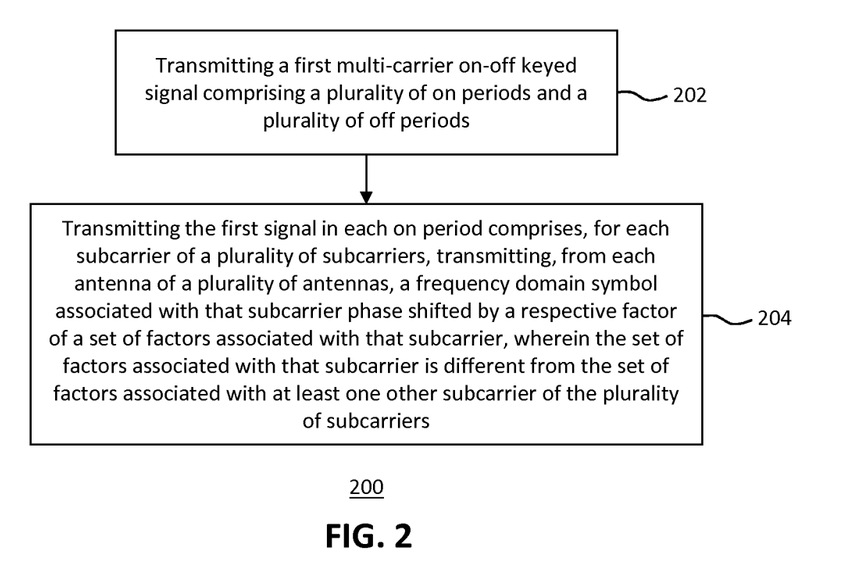
FIG. 2 is a flow chart of a method of transmitting signals.

FIG. 2 is a flow chart of an example of a method 200 of transmitting signals. The method may in some examples be implemented, and hence the signals transmitted, by a device such as an access point (AP). The method 200 comprises, in step 202, transmitting a first multi-carrier on-off keyed (MC-OOK) signal comprising a plurality of on periods and a plurality of off periods. Transmitting the first signal in each on period comprises, for each subcarrier of a plurality of subcarriers, in step 204, transmitting, from each antenna of a plurality of antennas, a frequency domain symbol associated with that subcarrier phase shifted by a respective factor of a set of factors associated with that subcarrier, wherein the set of factors associated with that subcarrier is different from the set of factors associated with at least one other subcarrier of the plurality of subcarriers.

In other words, for example, the respective set of factors applied to at least two subcarriers is different. As a result, for example, the interference pattern produced by transmitting signals from the antennas is different for at least two of the subcarriers.

Figure 3:
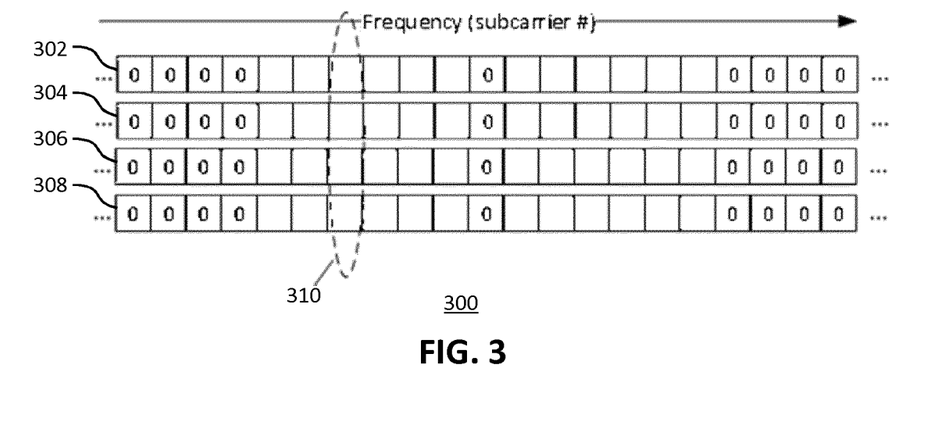
FIG. 3 is a schematic illustration of subcarriers that are transmitted from four antennas of an example device.

FIG. 3 is a schematic illustration of subcarriers that are transmitted from four antennas of an example device. Subcarriers 302 are transmitted from a first antenna, subcarriers 304 are transmitted from a second antenna, subcarriers 306 are transmitted from a third antenna and subcarriers 308 are transmitted from a fourth antenna. Each box represents one subcarrier. Where a box contains '0', the subcarrier is unused (e.g. no signals are transmitted using that subcarrier from that antenna either in an 'ON' or 'OFF' period of a MC-OOK signal). Where a box is empty, the subcarrier is used (e.g. a signal is transmitted using that subcarrier from that antenna in an 'ON' period of a MC-OOK signal). A vertical column of boxes represents one subcarrier. For example, boxes 310 represent one subcarrier transmitted from each of the four antennas. A signal transmitted from the four antennas using the subcarrier 310, for example in an 'ON' period, may comprise for example a frequency domain symbol shifted by a set of factors associated with that subcarrier. That is, a respective factor is applied to the frequency domain symbol transmitted from each antenna for the subcarrier 310.

In some examples, the set of factors associated with each subcarrier corresponds to a row or column of a Discrete Fourier transform (DFT) matrix. In some examples, each row (or column) of the DFT matrix is used the minimum number of times. That is, for example, where the number of subcarriers is equal to the number of rows (or columns), each row (or column) is used once as a set of factors for a respective subcarrier. For example, the number of subcarriers is greater than a size of the DFT matrix, and the sets of factors associated with the subcarriers include sets corresponding to every row or column of the DFT matrix. If the number of subcarriers is double the number of rows (or columns), each row (or column) is used twice, and so on. In other examples, for example, the number of subcarriers may be less than or equal to a size of the DFT matrix, and the set of factors associated with each subcarrier comprises a different respective row or column of the DFT matrix.

In some examples, a matrix may be used that provides sets of factors, wherein the set of factors associated with one subcarrier is different from the set of factors associated with at least one other subcarrier. In some examples, the matrix generates orthogonal beams, the DFT matrix being an example.

Figure 4:
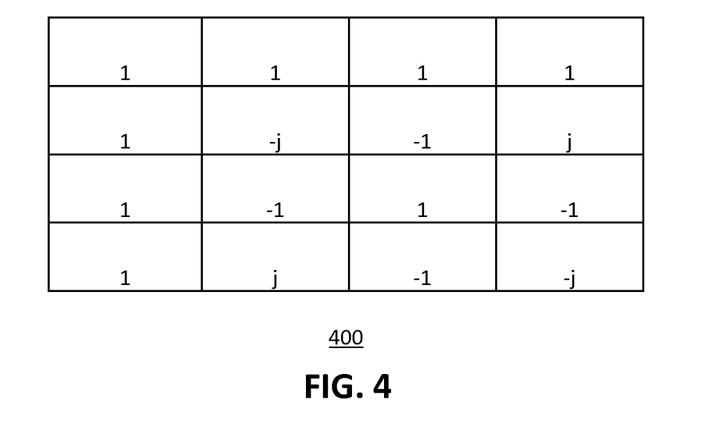
FIG. 4 shows an example of a 4×4 Discrete Fourier Transform (DFT) matrix.
Figure 5:
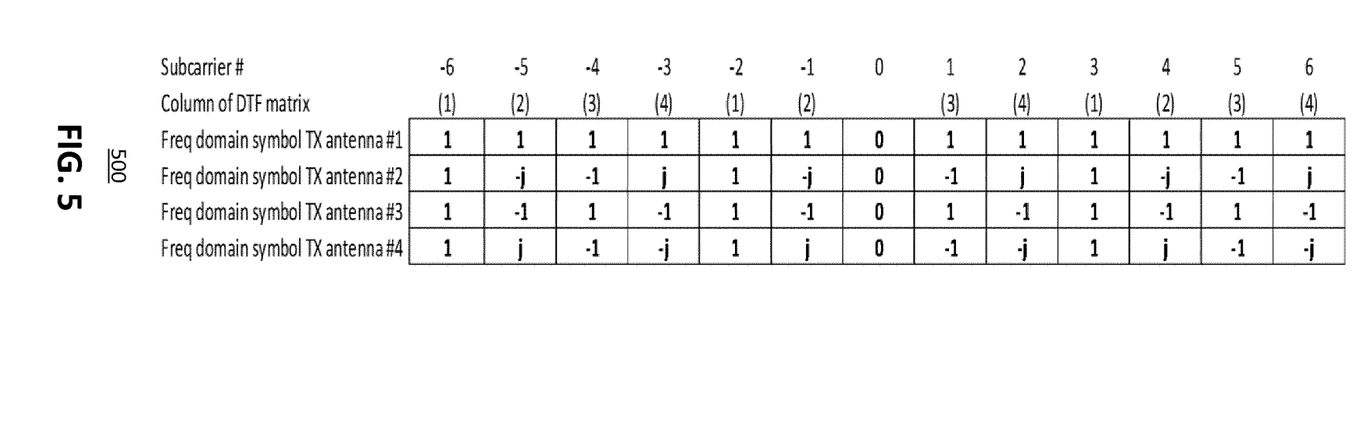
FIG. 5 shows an example of factors applied to a frequency domain symbol transmitted from each subcarrier and each antenna.

FIG. 4 shows an example of a 4×4 DFT matrix 400. FIG. 5 shows an example of the factors 500 applied to the frequency domain symbol transmitted from each subcarrier and each antenna, in an example using the DFT matrix 400 of FIG. 4, 12 subcarriers numbered from −6 to 6 (subcarrier 0 is unused), and four antennas. It can be seen that for each of subcarriers −6 to −3, the factors applied to the frequency domain symbol transmitted from each antenna correspond to a column (or row) of the DFT matrix 400. Different columns of the DFT matrix are applied to the subcarriers −6 to −3. For subcarriers −2 to 2 (not including subcarrier 0), the sequence repeats, and hence different columns (or rows) of the DFT matrix 400 are applied to each of these subcarriers. Similarly, the sequence repeats for subcarriers 3 to 6. It can be seen that each of the columns (or rows) of the DFT matrix is used three times. In some examples, the transmitter is used in an 802.11ba system (e.g. using a 64-point DFT), in which the subcarriers are labelled −32,−31, . . . , 30,31. To illustrate particular subcarriers, for example subcarriers −6, −2 and 3, the frequency domain symbol transmitted from each antenna is not shifted (the factor applied is 1) and the same symbol is transmitted on all of these antennas. On the other hand, for subcarriers −5, −1 and 4, the factors applied to the symbol transmitted from each antenna correspond to the second column (or row) of the DFT matrix 400, and so a different symbol is transmitted from each antenna for each of the subcarriers −5, −1 and 4.

Figure 6:
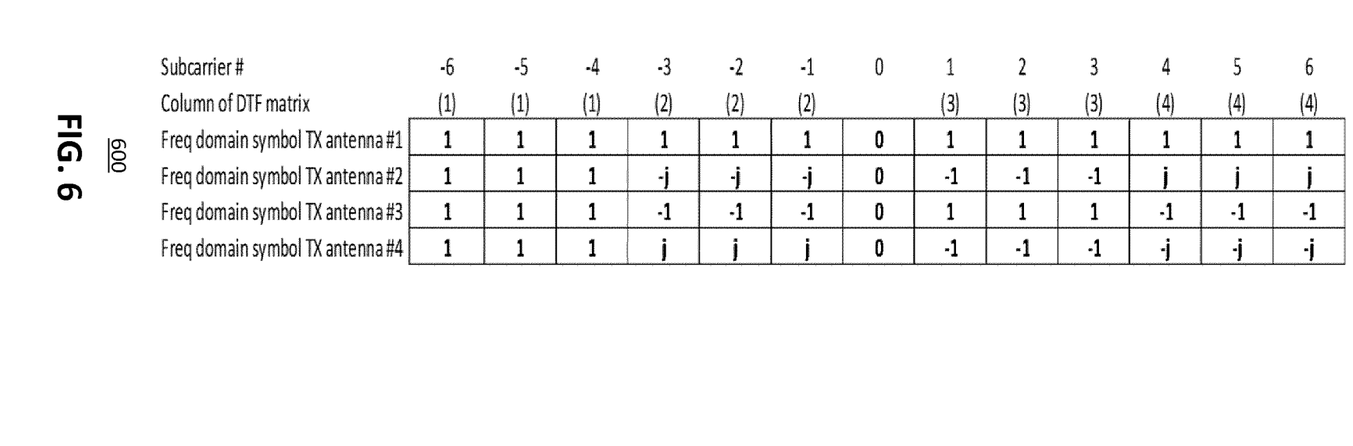
FIG. 6 shows another example of factors applied to a frequency domain symbol transmitted from each subcarrier and each antenna.

FIG. 6 shows another example of the factors 600 applied to the frequency domain symbol transmitted from each subcarrier and each antenna, in an example using the DFT matrix 400 of FIG. 4, 12 subcarriers numbered from −6 to 6 (subcarrier 0 is unused), and four antennas. As in FIG. 5, each column (or row) of the DFT matrix is used three times. However, in this case, the sets of factors (i.e. the columns or rows of the DFT matrix) are applied to the subcarriers in a different order.

Figure 7:
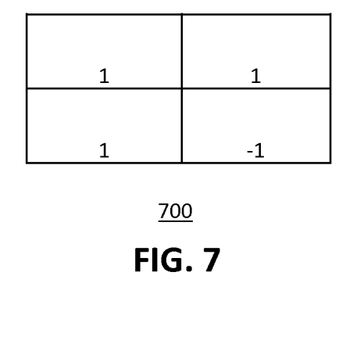
FIG. 7 shows an example of a 2×2 Discrete Fourier Transform (DFT) matrix.
Figure 8:
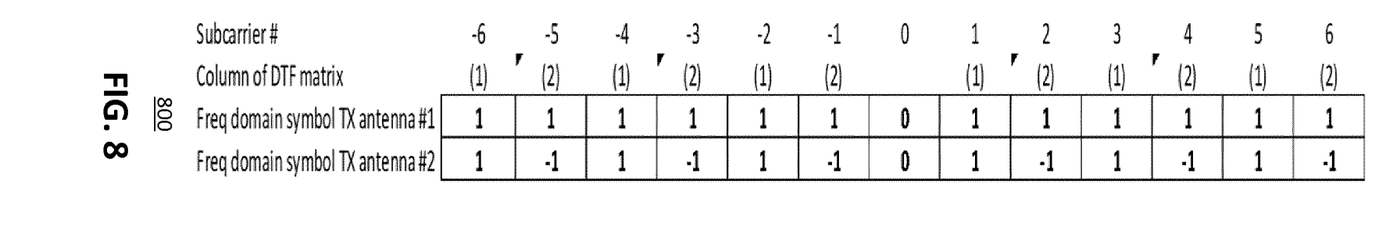
FIG. 8 shows an example of factors applied to a frequency domain symbol transmitted from each subcarrier and each antenna.

FIG. 7 shows an example of a 2×2 Discrete Fourier Transform (DFT) matrix 700. This matrix may be used in a two-antenna transmitter. In some examples, the size of the DFT matrix matches the number of transmit antennas, though in other examples the two values may be different. For example, one may be an integer multiple of the other. FIG. 8 shows an example of factors 800 applied to a frequency domain symbol transmitted from each subcarrier and each antenna in the two-antenna system. Each column (or row) of the DFT matrix 700 is used six times.

In some examples, the factors are all applied to the same frequency domain symbol. However, in other examples, the factors for different subcarriers may be applied to different frequency domain symbols. For example, for a first subcarrier, the factors for that subcarrier (to produce signals for each antenna) may be applied to a first frequency domain symbol. For a second subcarrier, the factors for that subcarrier may be applied to a second frequency domain symbol. The first and second frequency domain symbols may be the same in some examples, or may be different in some examples.

Figure 9:
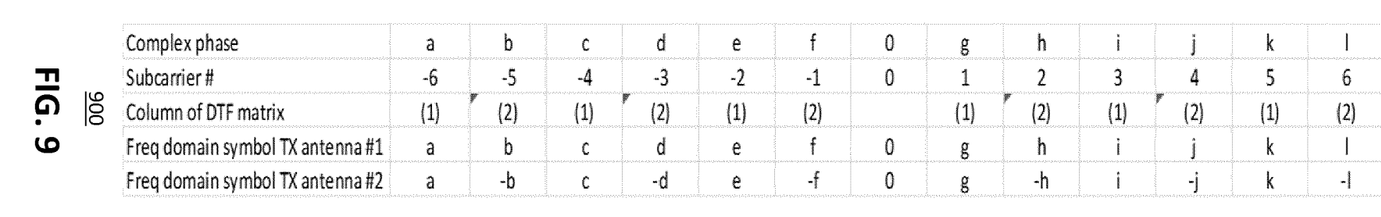
FIG. 9 shows an example of general frequency domain symbols transmitted on each subcarrier and on each antenna.

FIG. 9 shows an example of general frequency domain symbols transmitted on each subcarrier and on each antenna in a two-antenna system. The complex phase for a frequency domain symbol associated with each subcarrier, on subcarriers −6 to 6 (not including subcarrier 0), is represented by a complex phase value a, b, c, d, e, f, g, h, i, k and l respectively. Then, for each subcarrier, the associated frequency domain symbol is phase shifted by the set of factors associated with that subcarrier to produce the set of frequency domain symbols to transmit from both antennas using that subcarrier. For example, for subcarrier −5, the complex phase b is shifted by the second column (or row) of the 2×2 DFT matrix to produce frequency domain symbols of b and −b. Each of these is then transmitted on subcarrier −5 from respective antennas.

In some examples, each of the complex values a, b, c, d, e, f, g, h, i, k and l may represent a respective phase and amplitude value. In some examples, each value of a, b, c, d, e, f, g, h, i, k and l may be different, or at least some of the values may be the same. In some examples, the same values for a, b, c, d, e, f, g, h, i, k, k and l may be used for different 'ON' periods for the MC-OOK signal, whereas in other embodiments one, more than one or all of these values may vary between 'ON' periods. Thus, for example, the respective frequency domain symbol associated with one or more of the subcarriers may be the same or different in different on periods.

In some examples, the plurality of subcarriers comprise orthogonal subcarriers, e.g. the signals transmitted from one antenna on all used subcarriers (e.g. an OFDM symbol) are orthogonal signals.

In some examples, the first signal comprises a plurality of data symbols, each data symbol corresponds to an on period and an off period in a respective symbol period, and the order of the on period and the off period in each symbol period is based on the data symbol corresponding to the symbol period. Thus, for example, the signal may comprise a Manchester-coded MC-OOK symbol where an OFDM symbol (e.g. a multi-carrier signal) is transmitted in each 'ON' period. The data symbols in some examples may correspond to at least part of a wake up packet (WUP), such as for example at least part of an 802.11ba WUP. Upon receipt of the WUP, a Wake-Up Receiver (WUR) may wake up another device or component such as for example a Wi-Fi receiver or 802.11 PCR.

Repeated use of the same OFDM symbols to generate the 'ON' part of a MC-OOK signal can lead to undesirable spectral lines, because repetition may create strong correlations in time. This problem can be addressed in some embodiments, where a set of matrices that generate orthogonal beams is chosen. The multi-antenna MC-OOK signal is generated as described by any of the embodiments above, but the matrix used to provide factors to be applied to the frequency domain symbols transmitted on each subcarrier from each antenna may be chosen in a ransom or pseudo-random fashion, and may therefore change from one 'ON' period (e.g. OFDM symbol) to the next. An example of generating a set of matrices comprises applying circular shifts to a DFT matrix. That is, for example, all the columns of the DFT matrix are circularly shifted by the same number of steps. In some examples, the set of matrices may consist of only two matrices, for example the DFT matrix and a second matrix obtained by circularly shifting the DFT matrix by one step (or one or more steps for DFT matrices larger than 2×2). This randomization of selected matrix may reduce or eliminate the above-mentioned spectral lines.

Figure 10:
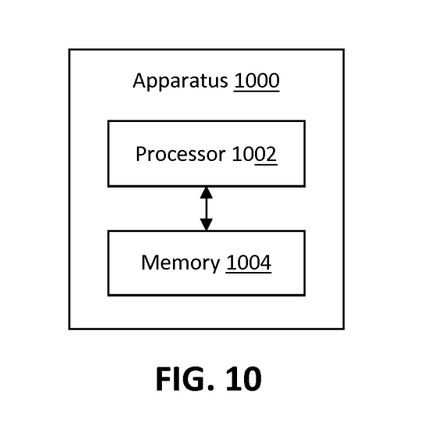
FIG. 10 is a schematic of an example of apparatus for transmitting signals.

FIG. 10 is a schematic of an example of apparatus 1000 for transmitting signals. The apparatus comprises a processor 1002 and a memory 1004. The memory 1004 contains instructions executable by the processor 1002 such that the apparatus 1000 is operable to transmit a first multi-carrier on-off keyed signal comprising a plurality of on periods and a plurality of off periods. Transmitting the first signal in each on period comprises, for each subcarrier of a plurality of subcarriers, transmitting, from each antenna of a plurality of antennas, a frequency domain symbol associated with that subcarrier phase shifted by a respective factor of a set of factors associated with that subcarrier, wherein the set of factors associated with that subcarrier is different from the set of factors associated with at least one other subcarrier of the plurality of subcarriers. In some examples, the apparatus 1000 may be configured to carry out the method 200 of FIG. 2. For example, the memory 1004 may contain instructions executable by the processor 1002 such that the apparatus 1000 is operable to carry out the method 200 of FIG. 2.

Figure 11:
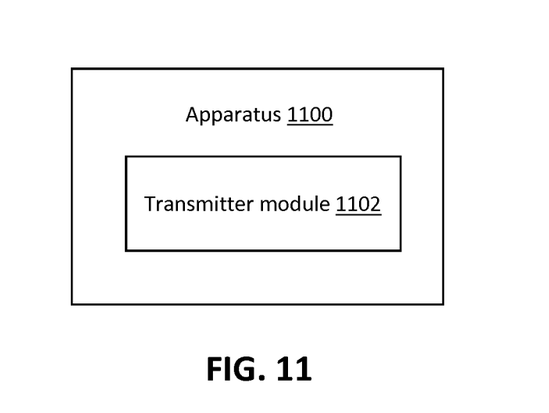
FIG. 11 is a schematic of an example of apparatus for transmitting signals.

FIG. 11 is a schematic of an example of apparatus 1100 for transmitting signals. The apparatus 1100 comprises a transmitter module 1102 configured to transmit a first multi-carrier on-off keyed signal comprising a plurality of on periods and a plurality of off periods. The transmitter module 1102 is configured to transmit the first signal in each on period by, for each subcarrier of a plurality of subcarriers, transmitting, from each antenna of a plurality of antennas, a frequency domain symbol associated with that subcarrier phase shifted by a respective factor of a set of factors associated with that subcarrier, wherein the set of factors associated with that subcarrier is different from the set of factors associated with at least one other subcarrier of the plurality of subcarriers. In some examples, the apparatus 1000 may be configured to carry out the method 200 of FIG. 2.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method of transmitting signals, the method comprising:
   transmitting a first multi-carrier on-off keyed signal comprising a plurality of on periods and a plurality of off periods;
   wherein the transmitting the first signal in each on period comprises, for each subcarrier of a plurality of subcarriers:
   transmitting, from a plurality of antennas, a frequency domain symbol associated with that subcarrier;
   wherein the frequency domain symbol comprises a symbol transmitted from the plurality of antennas using the subcarrier;
   wherein the symbol transmitted from each antenna is phase shifted by a respective factor of a set of factors associated with that subcarrier;
   wherein the set of factors associated with that subcarrier is different from the set of factors associated with at least one other subcarrier of the plurality of subcarriers.

2. The method of claim 1, wherein the set of factors associated with each subcarrier corresponds to a row or column of a discrete Fourier transform (DFT) matrix.

3. The method of claim 2, wherein respective factors associated with each subcarrier transmitted from the same antenna correspond to a column or row of a DFT matrix.

4. The method of claim 2, wherein the number of subcarriers is a positive integer multiple of a size of the DFT matrix.

5. The method of claim 2, wherein the number of subcarriers is less than or equal to a size of the DFT matrix, and wherein the set of factors associated with each subcarrier comprises a different respective row or column of the DFT matrix.

6. The method of claim 2, wherein the number of subcarriers is greater than a size of the DFT matrix, and wherein the sets of factors associated with the subcarriers include sets corresponding to every row or column of the DFT matrix.

7. The method of claim 1, wherein at least one of the sets of factors corresponds to no phase shift of the symbols associated with that factor.

8. The method of claim 1, wherein the respective symbol associated with each subcarrier comprises a first symbol phase shifted by a respective amount.

9. The method of claim 1, wherein the plurality of subcarriers comprise orthogonal subcarriers.

10. The method of claim 1, wherein the respective symbol associated with one or more of the subcarriers may be the same or different in different on periods.

11. The method of claim 1, wherein the first signal comprises a plurality of data symbols, each data symbol corresponding to an on period and an off period in a respective symbol period; and wherein the order of the on period and the off period in each symbol period is based on the data symbol corresponding to the symbol period.

12. The method of claim 11, wherein the order of the on period and the off period in each symbol period is selected based on Manchester coding of the corresponding data symbol.

13. The method of claim 11, wherein the data symbols correspond to a wake up packet (WUP).

14. A non-transitory computer readable recording medium storing a computer program product for controlling the transmitting of signals, the computer program product comprising program instructions which, when run on processing circuitry of an apparatus, causes the apparatus to:
   transmit a first multi-carrier on-off keyed signal comprising a plurality of on periods and a plurality of off periods;
   wherein the transmitting the first signal in each on period comprises, for each subcarrier of a plurality of subcarriers:
   transmitting, from a plurality of antennas, a frequency domain symbol associated with that subcarrier;
   wherein the frequency domain symbol comprises a symbol transmitted from the plurality of antennas using the subcarrier;
   wherein the symbol transmitted from each antenna is phase shifted by a respective factor of a set of factors associated with that subcarrier;

wherein the set of factors associated with that subcarrier is different from the set of factors associated with at least one other subcarrier of the plurality of subcarriers.

15. An apparatus for transmitting signals, the apparatus comprising:
processing circuitry;
memory containing instructions executable by the processing circuitry whereby the apparatus is operative to:
transmit a first multi-carrier on-off keyed signal comprising a plurality of on periods and a plurality of off periods;
wherein the transmitting the first signal in each on period comprises, for each subcarrier of a plurality of subcarriers:
transmitting, from a plurality of antennas, a frequency domain symbol associated with that subcarrier;
wherein the frequency domain symbol comprises a symbol transmitted from the plurality of antennas using the subcarrier;
wherein the symbol transmitted from each antenna is phase shifted by a respective factor of a set of factors associated with that subcarrier;
wherein the set of factors associated with that subcarrier is different from the set of factors associated with at least one other subcarrier of the plurality of subcarriers.

16. The apparatus of claim 15, wherein the set of factors associated with each subcarrier corresponds to a row or column of a discrete Fourier transform (DFT) matrix.

17. The apparatus of claim 16, wherein respective factors associated with each subcarrier transmitted from the same antenna correspond to a column or row of a DFT matrix.

18. The apparatus of claim 16, wherein the number of subcarriers is a positive integer multiple of a size of the DFT matrix.

19. The apparatus of claim 16, wherein the number of subcarriers is less than or equal to a size of the DFT matrix, and wherein the set of factors associated with each subcarrier comprises a different respective row or column of the DFT matrix.

20. The apparatus of claim 16, wherein the number of subcarriers is greater than a size of the DFT matrix, and wherein the sets of factors associated with the subcarriers include sets corresponding to every row or column of the DFT matrix.

21. The apparatus of claim 15, wherein at least one of the sets of factors corresponds to no phase shift of the symbols associated with that factor.

22. The apparatus of claim 15, wherein the respective symbol associated with each subcarrier comprises a first symbol phase shifted by a respective amount.

23. The apparatus of claim 15, wherein the plurality of subcarriers comprise orthogonal subcarriers.

24. The apparatus of claim 15, wherein the respective symbol associated with one or more of the subcarriers may be the same or different in different on periods.

25. The apparatus of claim 15, wherein the first signal comprises a plurality of data symbols, each data symbol corresponds to an on period and an off period in a respective symbol period; and wherein the order of the on period and the off period in each symbol period is based on the data symbol corresponding to the symbol period.

26. The apparatus of claim 25, wherein the order of the on period and the off period in each symbol period is selected based on Manchester coding of the corresponding data.

* * * * *

UNITED STATES PATENT AND TRADEMARK OFFICE
CERTIFICATE OF CORRECTION

| | |
|---|---|
| PATENT NO. | : 11,431,532 B2 |
| APPLICATION NO. | : 17/273606 |
| DATED | : August 30, 2022 |
| INVENTOR(S) | : Lopez et al. |

It is certified that error appears in the above-identified patent and that said Letters Patent is hereby corrected as shown below:

In the Specification

In Column 1, Line 25, delete "(PLOP" and insert -- (PLCP --, therefor.

In Column 1, Line 26, delete "PLOP" and insert -- PLCP --, therefor.

Signed and Sealed this
Fourth Day of April, 2023

Katherine Kelly Vidal
*Director of the United States Patent and Trademark Office*